Figure 3:
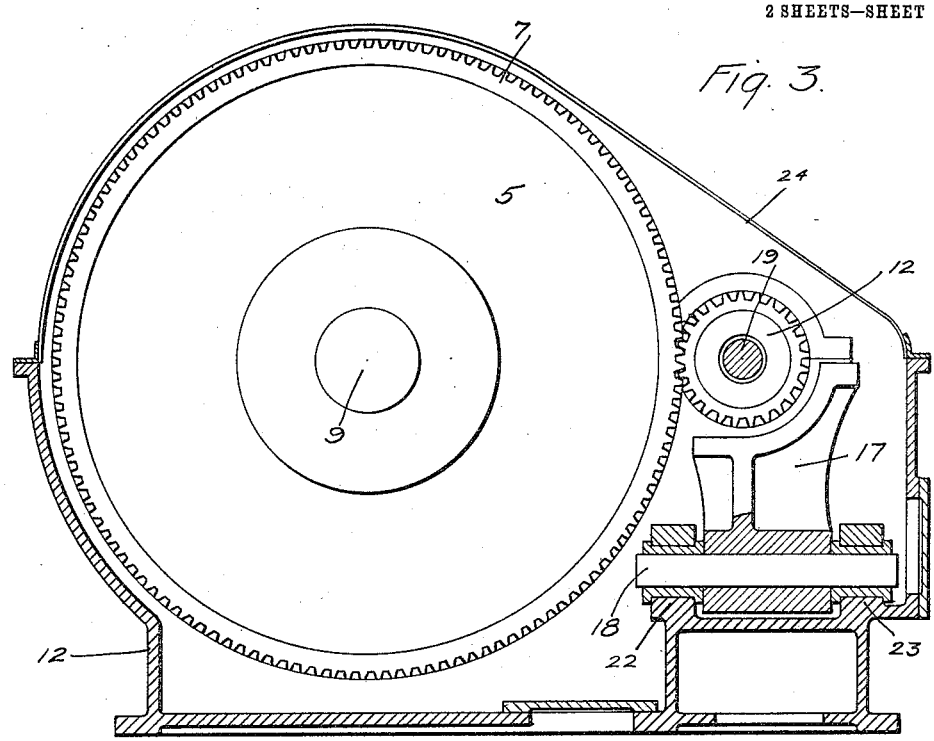

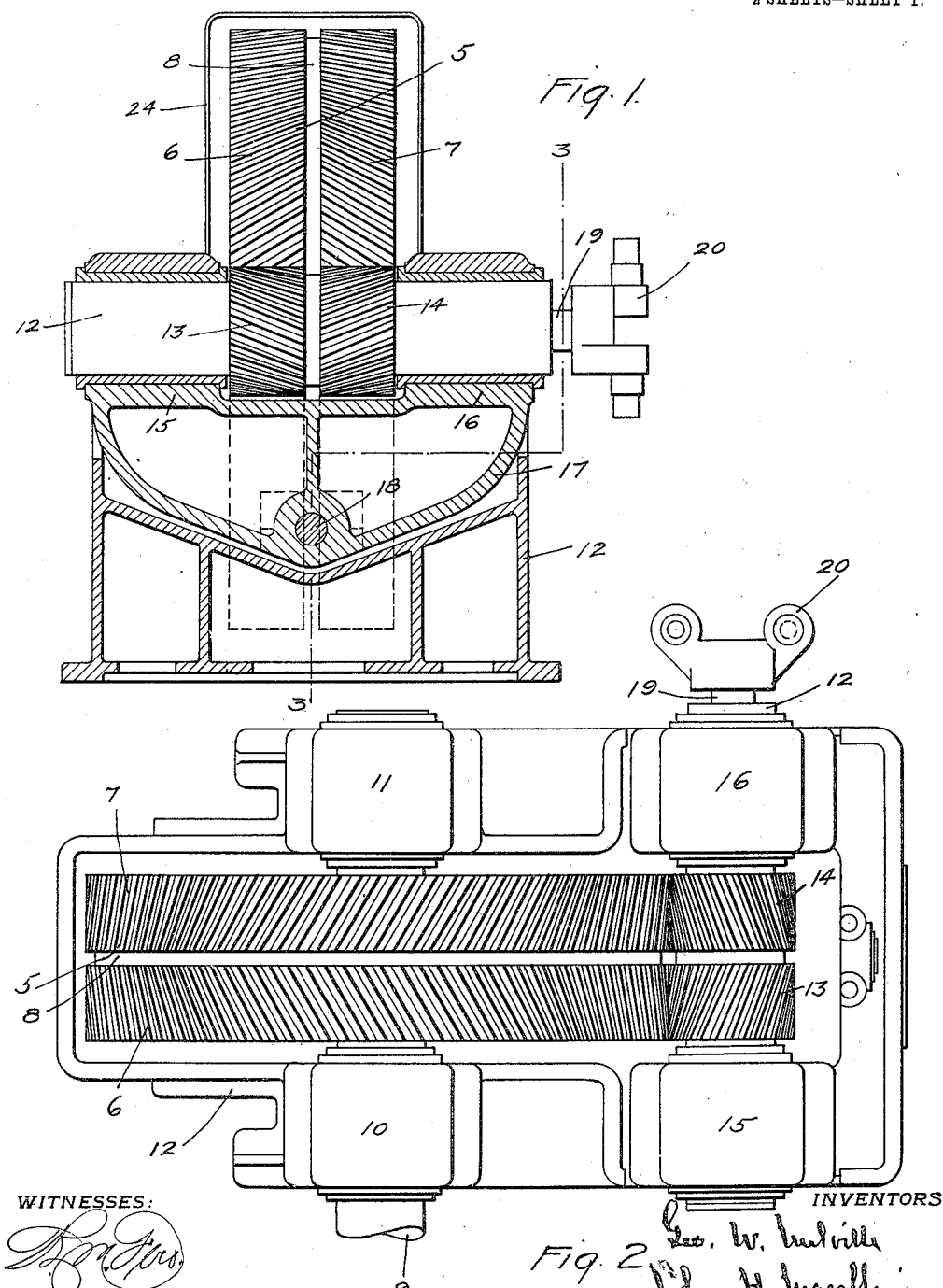

G. W. MELVILLE & J. H. MACALPINE.
REDUCTION GEARING.
APPLICATION FILED DEC. 7, 1909.

946,456.

Patented Jan. 11, 1910.
2 SHEETS—SHEET 2.

WITNESSES:

INVENTORS

BY

THEIR ATTORNEY IN FACT.

UNITED STATES PATENT OFFICE.

GEORGE W. MELVILLE AND JOHN H. MACALPINE, OF PHILADELPHIA, PENNSYLVANIA.

REDUCTION-GEARING.

946,456.  Specification of Letters Patent.  Patented Jan. 11, 1910.

Application filed December 7, 1909. Serial No. 531,809.

*To all whom it may concern:*

Be it known that we, GEORGE W. MELVILLE and JOHN H. MACALPINE, citizens of the United States, and residents of Philadelphia, in the county of Philadelphia and State of Pennsylvania, have made a new and useful Invention in Reduction-Gearing, of which the following is a specification.

This invention relates to reduction gearing and as an object has the production of gearing for transmitting power from high speed motors, such as turbines, to apparatus to be run at lower speeds, such for instance as the propeller shafts of ships.

A further object of this invention is the production of reduction gearing in which the tooth pressures are automatically adjusted and distributed during the transmission of power.

These, as well as other objects which will readily appear to those skilled in this art, we attain by the device decsribed in the specification and illustrated in the drawings accompanying same and forming a part of this application, and throughout which like elements are denoted by like characters.

Figure 4:
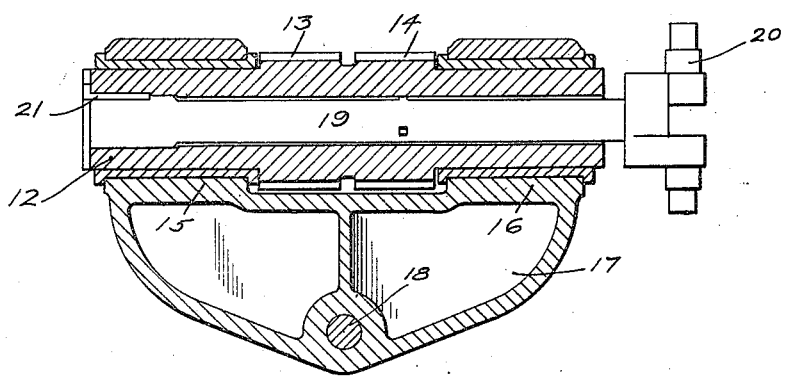

In the drawings, Figure 1 is a view in elevation of a device embodying this invention with a portion of the housing thereof removed for the sake of illustration. Fig. 2 is a plan view of the device illustrated in Fig. 1. Fig. 3 is a sectional elevation taken on the line 3—3 of Fig. 1 looking toward the left of said figure, and Fig. 4 is a view in section of the pinion member and its mounting frame employed in our invention.

Broadly, our invention consists in mounting the frame carrying the pinion member of spur gearing, on a pin arranged in such a manner that the pinion is free to be rocked due to the tooth pressures encountered in a plane perpendicular to the plane including the axes of the gear and pinion and including the axis of the pinion but is restrained and prevented from moving in the plane including the axes of the gear and pinion.

For the purpose of fully illustrating our invention but with no idea of limiting the same to certain specific details, we have shown the invention as applied to a spur gear in which the gear and pinion members are provided with reversely arranged spiral teeth, as in the ordinary form of herringbone gearing.

In the device chosen for illustration, a gear member 5 consisting of two sets of gear teeth, 6 and 7, separated at their inner ends by a channel 8, is mounted on a shaft 9 which is adapted to be connected to the apparatus to be run at a reduced speed such as a propeller shaft. The shaft 9 is journaled within suitable bearings 10 and 11 carried in a frame portion 12 which in turn serves as a portion of the housing for the device. A pinion member which consists of a hollow shaft 12 provided with two sets of oppositely arranged spiral teeth 13 and 14, preferably formed integrally therewith, meshes with the gear member. The shaft 12 is journaled within suitable bearings 15 and 16 carried in a frame 17, pivotally mounted on a pin 18.

The shaft 12 which is adapted to be driven from the high speed motor such as a turbine, the speed of which it is desired to reduce, is preferably connected to the motor shaft through the medium of a shaft 19 and flexible coupling 20 of any desired form. Shaft 12 is formed hollow and shaft 19 lies within the same and is secured thereto only at the end farthest removed from coupling 20, preferably by means of one or more keys 21. This construction, it will be seen, performs the same function as though an extremely long shaft between the motor and the pinion were provided. Pivoted frame 17 is formed as light as is consistent with the rigidity required.

Pin 18 which supports the pinion frame preferably fits the opening therefor in said frame tightly. The pin is journaled in suitable bearings 22 and 23 located on opposite sides of the plane including the axis of the pinion and which stands perpendicular to the plane passing through the axes of the gear and pinion. These bearings are mounted in a portion of the main frame of the device. By having these bearings located as they are it will be seen that the pinion would be prevented from moving except in the plane above described.

The device is preferably provided with a removable cover 24 and it will be understood of course that suitable means for lubricating the device will be provided. If desired the pinion member may be provided with three bearings, one of which may be located between the two sets of teeth.

In the device illustrated, while the gear and pinion are both provided with spiral teeth, straight teeth may, if desired, be utilized. When spiral teeth are utilized however, the longitudinal position of the pinion and the angular position of its axis, is determined exclusively by the action of the spiral teeth. The flexible coupling between the pinion shaft and the motor shaft is preferably of a construction such that it can only exert a rotative torque on the pinion without exerting any force axially.

In accordance with the provisions of the patent statutes, we have described the principle of operation of our invention, together with the device which we now consider to represent the best embodiment thereof, but we desire to have it understood that the device shown is only illustrative and that the invention can be carried out by other means.

What we claim is:

1. In reduction gearing, a gear, a pinion meshing therewith, a frame carrying said pinion and a pin for pivotally mounting said frame and provided with bearings on opposite sides of the plane including the axis of said pinion and perpendicular to the plane including the axes of the gear and pinion so that said frame is capable of being swung by the tooth pressures during the operation of the gearing to permit of the automatic distribution of such pressures.

2. In reduction gearing, a gear, a pinion meshing therewith, a frame carrying said pinion and means for pivotally mounting said frame so that said frame is capable of being swung by the tooth pressures during the operation of the gearing to permit of the automatic distribution of such pressures.

3. In reduction gearing, a gear, a pinion meshing therewith, a frame carrying said pinion and a mounting pin for said frame located below said pinion so that said frame is capable of being swung by the tooth pressures during the operation of the gearing to permit of the automatic distribution of such pressures.

4. In reduction gearing, a gear, a pinion meshing therewith, a frame carrying said pinion, a pin passing through said frame below said pinion, and bearings on opposite sides of the center line of said pinion for supporting said pin all constructed and arranged so that said frame is capable of being swung by the tooth pressures during the operation of the gearing to permit of the automatic distribution of such pressures.

5. In reduction gearing, a gear, a pinion meshing therewith, a frame carrying said pinion and a pin for pivotally supporting said frame located below said pinion and midway between the ends thereof all constructed and arranged so that said frame is capable of being swung by the tooth pressures during the operation of the gearing to permit of the automatic distribution of such pressures.

6. In reduction gearing, a gear, a pinion meshing therewith, a frame carrying said pinion and a pin mounting member passing through said frame below said pinion and journaled in bearings located on opposite sides of the axis of said pinion all constructed and arranged so that said frame is capable of being swung by the tooth pressures during the operation of the gearing to permit of the automatic distribution of such pressures.

In testimony whereof, I have hereunto subscribed my name this 6th day of December, 1909.

GEORGE W. MELVILLE.

Witnesses:
  JNO. S. GREEN,
  W. J. SKEEN.

In testimony whereof, I have hereunto subscribed my name this 4th day of December, 1909.

JOHN H. MACALPINE.

Witnesses:
  JNO. S. GREEN,
  C. W. MCGHEE.